July 15, 1924.

S. A. KOST

DISINTEGRATOR

Filed June 27, 1923   2 Sheets-Sheet 1

1,501,282

Inventor.
Stephen A. Kost
By Popp & Powers
Attys

July 15, 1924.

S. A. KOST

DISINTEGRATOR

Filed June 27, 1923   2 Sheets-Sheet 2

1,501,282

Inventor
Stephen A. Kost
by Popp & Bowers
Attys

Patented July 15, 1924.

1,501,282

UNITED STATES PATENT OFFICE.

STEPHEN A. KOST, OF BUFFALO, NEW YORK.

DISINTEGRATOR.

Application filed June 27, 1923. Serial No. 648,149.

*To all whom it may concern:*

Be it known that I, STEPHEN A. KOST, a citizen of the United States, residing at Buffalo, in the county of Erie and State of New York, have invented a new and useful Improvement in Disintegrators, of which the following is a specification.

This invention relates to a disintegrator which is more particularly designed for reducing soil containing sod, lumps, roots, etc., and permit of separating the coarse material from the fine material so that the fine material will be ready for seeding or potting by florists and for similar purposes.

It is the object of this invention to provide a disintegrator for this purpose which is comparatively light and strong and capable of a large capacity, and which will thoroughly disintegrate or tear apart the soil or ground which is fed to the same and separate the stones, roots and the like from the fine soil, and which can be readily adjusted to treat different kinds of soil to the best advantage without liability of clogging the machine or otherwise interfering with its operation.

Figure 1:
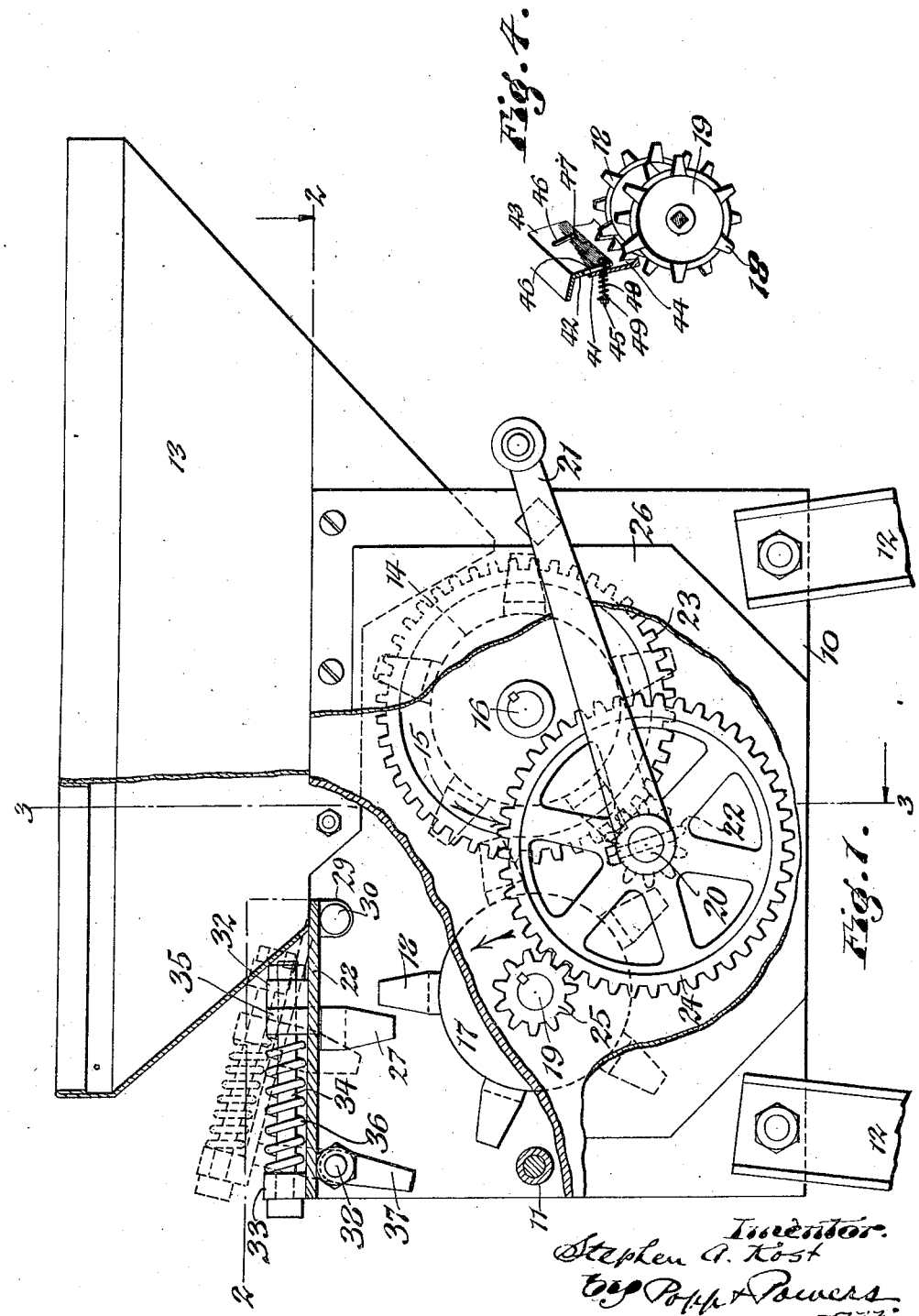
Figure 2:
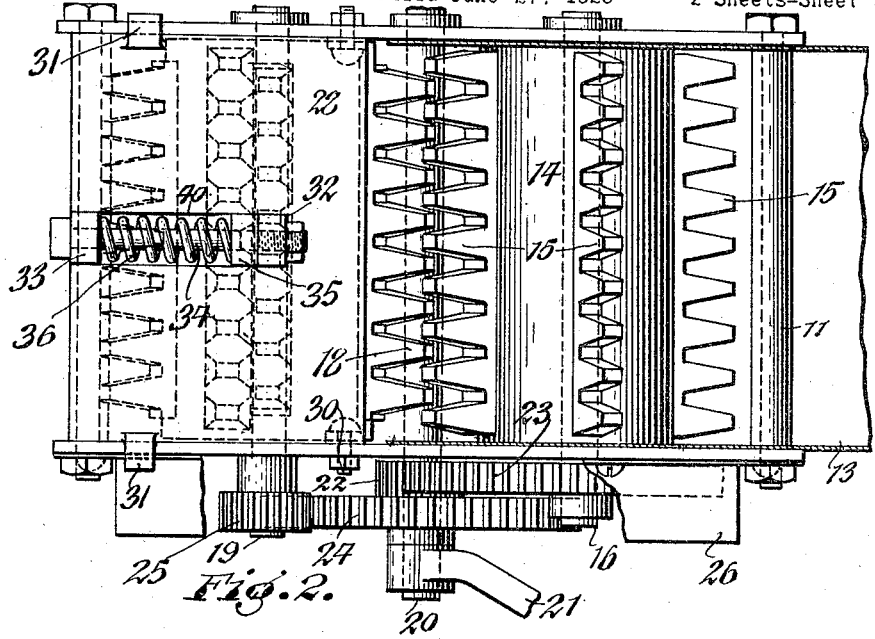
Figure 3:
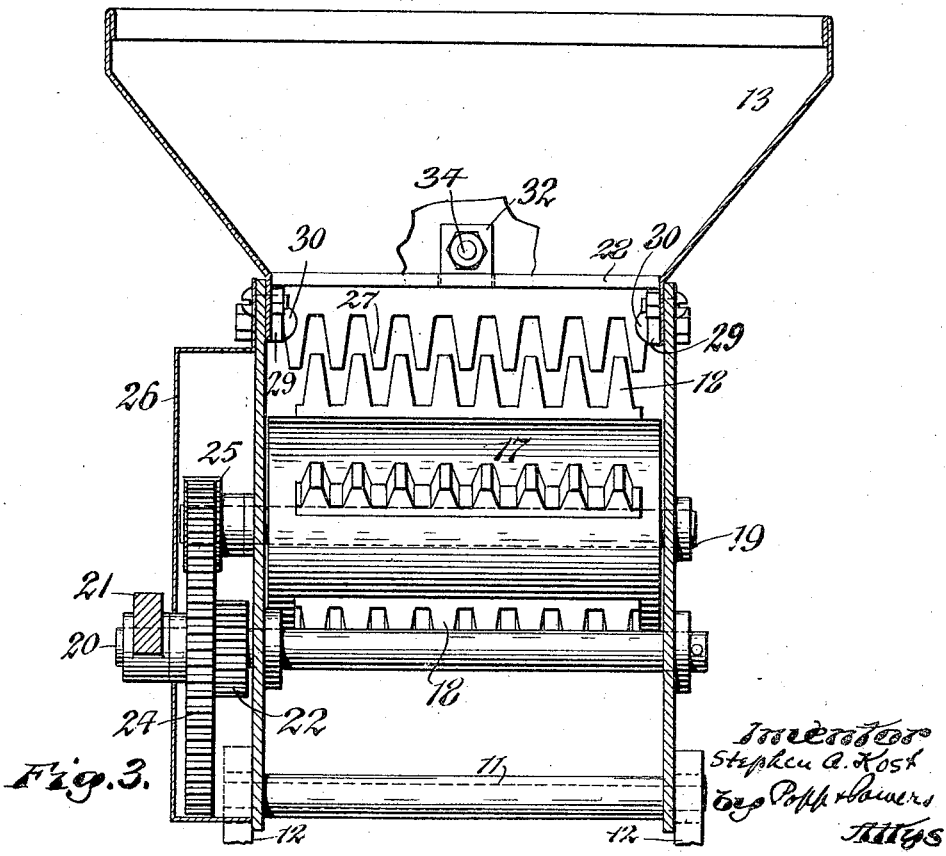

In the accompanying drawings:

Figure 1 is a side elevation of my improved disintegrator with a part of the side wall broken away. Figure 2 is a sectional top plan view of the same, the sectional part being taken on line 2—2 of Figure 1. Figure 3 is a vertical transverse section of the machine taken on line 3—3 of Figure 1. Fig. 4 is a fragmentary sectional perspective view showing a modified form of one feature of my invention.

Similar characters of reference indicate like parts in the several figures.

The numeral 10 represents the two side walls of a main frame which are arranged parallel to each other and spaced apart by suitable transverse spacers 11 and which, in effect, form between them a disintegrating chamber. These side walls are provided on their lower parts with legs 12 whereby the same are supported on the ground and to the upper front part of these walls is secured a supply hopper 13, whereby the material to be disintegrated is fed into the upper part of the disintegrating chamber.

Arranged horizontally and transversely within the front part of the disintegrating chamber and below the outlet of the hopper 13 is a feeding cylinder 14 which is provided on its periphery with a plurality of longitudinal rows of disintegrating teeth 15, each of these rows being constructed in the form of a comb, as shown in Figure 2. This feeding cylinder is mounted upon a horizontal shaft 16 which is journaled at its opposite ends in suitable bearings arranged on the side walls of the disintegrating chamber and is rotated so that its upper part moves rearwardly and downwardly relatively to the length of the machine whereby the teeth of the cylinder are caused to carry the material from the hopper rearwardly and downwardly in the disintegrating chamber. Within the rear part of the disintegrating chamber and adjacent to the rear side of the feeding cylinder is arranged a discharge cylinder 17 which is provided on its periphery with a plurality of longitudinal rows of disintegrating teeth 18, the teeth in each of these rows being constructed in the form of a comb, similar to the teeth of the feeding cylinder. The discharge cylinder is mounted on a shaft 19 which is journaled horizontally and transversely in suitable bearings on the side wall of the disintegrating chamber and the same is turned in the same direction in which the feeding cylinder is turned so that the upper side of the discharge cylinder moves rearwardly and downwardly and moves the material accordingly. The feeding and discharging cylinders are arranged sufficiently close to each other that the teeth of their respective combs intermesh for which purpose the teeth of the combs of each of these cylinders is caused to pass through the spaces between the teeth of the combs of the other cylinder. It follows from this construction that the opposing sides of these two cylinders will move in opposite directions, the teeth on the rear side of the feeding cylinder moving downwardly and the teeth on the front side of the discharge cylinder moving upwardly, whereby the material is carried from the hopper rearwardly and downwardly by the feeding cylinder and this material is then carried upwardly and rearwardly by the discharge cylinder, thereby causing this material to be torn apart, shredded or disintegrated due to the co-operation of the intermeshing teeth of these two cylinders. During this operation of the cylinders some of the fine dirt will fall downwardly between the opposing sides of these cylinders and on the floor, ground or receptacle immediately below the disintegrating chamber ready for use in seeding or potting plants or for other purposes. The remaining material is however thrown backwardly through the open rear end of the disintegrating chamber where the same collects in practically two piles which are independent of each other, one pile nearest to the machine consisting of the light finely divided ground which does not fly as far under the throwing action of the discharge cylinder and another pile farther removed from the rear side of the machine consisting of stones, roots and other heavy material which, by reason of its greater weight, is thrown farther by the action of the discharge cylinder. The fine material thus discharged from the rear side of the machine is ready for use by the florist for seeding or potting plants and the like while the stones and other refuse may be otherwise disposed of.

In order to increase the effectiveness of the disintegrating teeth of the feeding and discharge cylinders the same are preferably turned at different speeds, the feeding cylinder at a comparatively slow speed, and the discharge cylinder at a comparatively high rate of speed. By this means the feeding cylinder will take the raw dirt and feed the same backwardly and downwardly at a slow rate into the space between the two cylinders and at this point the teeth of the discharge cylinder which travels at a high rate picks up this material and by throwing the same upwardly between the downwardly moving teeth of the feeding cylinder will operate not only to tear or shred the soil rapidly and effectively so as to reduce the same rapidly but the discharge cylinder will also throw this material for a considerable distance from the rear side of the machine so as to produce a substantial separation between the fine light material and the heavy coarse material, which fine and light materials are caused to gather in two distinct piles in rear of the machine so that no further grading of this material is necessary after the same has been once operated upon.

Various means may be provided for operating the cylinders in the manner described but this is preferably accomplished by the hand operating driving mechanism which is shown in the drawings and which comprises a driving shaft 20 journaled horizontally and transversely in suitable bearings on the lower part of the side walls 10, and provided with a hand crank 21 for turning the same, a driving gear pinion 22 secured to this driving shaft and meshing with a driven gear wheel 23 secured to the adjacent end of the shaft 16 which carries the feeding cylinder, and a driving gear wheel 24 also secured to the driving shaft and meshing with the gear pinion 25 on the adjacent end of the shaft 19 which carries the discharge cylinder, as shown in Figures 1, 2 and 3.

This train of gearing is preferably so proportioned that the feeding cylinder makes one rotation to sixteen rotations of the discharge cylinder, but if desired the ratio of speed these two cylinders may be otherwise determined to suit the particular material which is to be treated or to meet other conditions. Instead of driving the shaft 20 by hand power, any suitable form of motor power may be employed for this purpose. For the purpose of preventing the operator from being injured by this gearing the same is preferably enclosed by a housing or guard 26, as shown in the drawings.

For the purpose of increasing the disintegrating effect of the machine a plurality of auxiliary disintegrating teeth 27 are arranged in a horizontal transverse row immediately above the discharge cylinder, the spaces between these auxiliary teeth being traversed by the teeth of the discharge cylinder when the auxiliary teeth are in their normal foremost position indicated by full lines in Figure 1. These auxiliary teeth are constructed in the form of a comb, similar to the teeth of the feeding and discharging cylinders and in the preferred construction of the machine these auxiliary teeth are so mounted that the same are capable of movement either automatically vertically toward and from the discharging cylinder or the same may be manually adjusted in this direction and the same are also capable of yielding backwardly relatively to the discharging cylinder in order to permit these auxiliary teeth when hit by stones, or hard lumps of dirt to yield the requisite extent for permitting the passage of such large hard material and thus avoid clogging the machine. The auxiliary teeth may be mounted in various ways for accomplishing this purpose but in the preferred construction shown in the drawings this is accomplished by the following means.

28 represents a supporting plate normally arranged horizontally and transversely adjacent to the upper rear parts of the side walls 10 of the disintegrating chamber in rear of the feed hopper 13. This plate is mounted at its front end on these side walls so as to be capable of swinging vertically toward and from the discharge cylinder, for which purpose this plate is provided on the underside of its front end with a pair of depending lugs 29 which are pivoted by means of horizontal transverse bolts 30 to the inner side of the side walls 10, as shown in Figures 1, 2 and 3. The downward movement of this plate is preferably effected by gravity due to its own weight and the parts mounted thereon, which downward movement may be limited by stopping means of any suitable character, for instance by means of stop lugs 31 arranged on opposite sides of its rear part and engaging with the upper edges of the side walls 10 of the disintegrating chamber, as shown in Figure 2. Midway of its longitudinal edges this supporting plate is provided with a longitudinal slot 40 and at the opposite ends of this slot this plate is provided with upwardly projecting front and rear lugs 32, 33. Supported lengthwise in these lugs is a guide rod 34 upon which is mounted an eye 35 which slides lengthwise thereon and projects from the upper side of the comb forming the auxiliary teeth 27 and through the longitudinal slot 40 of the supporting plate. This guide eye 35 is yieldingly held in engagement with the front supporting lug 32 so that the auxiliary teeth 27 stand in their normal foremost position, this being preferably accomplished by means of a spring 36 surrounding the guide rod 34 and bearing at its front end against the guide eye 35 while its rear end bears against the rear supporting lug 33.

When comparatively light or loose material is being operated upon the same after being subjected to the initial tearing and shredding action of the co-operating teeth of the feeding cylinder and discharge cylinder the same will be next acted upon by the co-operating action of the teeth of the discharge cylinder and the auxiliary teeth 27 whereby the material is further reduced or broken up before it is discharged from the rear side of the machine. If, however, the material contains any stones or hard lumps of ground or other materials which cannot pass between the co-operating teeth of the discharging cylinder and the auxiliary comb, the latter in that event will either be lifted out of the path of this large hard material as the same is pushed rearwardly by the teeth of the discharging cylinder, or the means which yieldingly hold the auxiliary comb in its forward position will yield and permit the passage of such hard large material. In either case the auxiliary comb will be moved away from the discharging cylinder automatically so as to provide a passage-way for this material between the combs of the discharging cylinder and the auxiliary comb which will permit the discharge of this material from the machine without liability of clogging the same. The operation of the machine is therefore at no time interrupted but instead the same may be operated continuously and thereby permit of obtaining the maximum output of the same.

When it is desired to operate upon material which contains a comparatively large proportion of stones and other hard material which ordinarily cannot pass through the space between the combs of the discharging cylinder and the auxiliary comb the latter is preferably adjusted so that it is permanently held in its elevated position and thus not only avoid unnecessary wear on the teeth of the discharging cylinder and the teeth of the auxiliary comb, but also permit the machine under these conditions to be operated more easily. This is preferably accomplished by means of a lifting device which may consist of a lifting arm 37 pivoted on the inner side of one of the side walls 10 by means of a bolt 38 so that the same may be swung manually either downwardly into its inoperative position in which the supporting plate and auxiliary comb are permitted to drop into their lowermost position, as shown in Figure 1 or this lifting arm may be raised into an upright position in which it holds the supporting plate and auxiliary comb in an elevated position, as shown by dotted lines in the same figure, so that a comparatively free passage is provided between the auxiliary comb and the combs of the discharging cylinder.

This machine is not only useful for disintegrating soil and grading the same so that it takes the place of the usual sieves heretofore employed for this purpose, but the same may also be used to advantage in shredding or reducing fiber, manure and other materials commonly used by florists.

Aside from being comparatively simple and durable in construction this machine permits of simultaneously effecting disintegration and grading of materials suitable for use by florists more expeditiously and economically than has been possible heretofore.

Instead of mounting the auxiliary comb in the manner shown in Figures 1, 2 and 3, this may be accomplished by the means shown in Figure 4, in which the comb 41 is provided with an upward extension 42 which engages with the rear side of an upright plate 43 mounted on a suitable stationary part of the machine. In this case the auxiliary comb is yieldingly held in its foremost position so that the teeth 18 of the discharging cylinder pass through the spaces between the teeth 44 of this auxiliary comb by means of a plurality of tension rods 45, each of which passes through an opening in the upper part of the comb plate 41 and an upright slot 46 in the supporting plate 43, a head 47 arranged at the front end of each of these rods and bearing against the front side of the plate 43, and a spring 48 surrounding each of these rods and bearing at its front end against the rear side of the plate 41, while its rear end bears against a washer 49 mounted on the rear end of the respective rod. In case a large stone or lump of hard material should get in between the teeth of this discharging cylinder and the teeth 44 of this auxiliary comb the latter would be deflected rearwardly as this material is moved in this direction by the discharging cylinder and thereby enable this large hard material to pass without clogging the machine or breaking any of the parts. After the material has thus passed, the resilience of the spring 48 again returns the auxiliary comb 44 to its normal operative position. The action therefore of relieving the auxiliary comb and restoring the same to its normal position is therefore automatic in the same general way in which this is accomplished in the construction shown in Figs. 1–3.

I claim as my invention:

1. A disintegrator comprising a casing having an inlet for the material to be disintegrated and an outlet for the disintegrated material, a rotary cylinder arranged in the casing and provided with teeth on its periphery, a comb arranged above said outlet and having the space between its teeth traversed by the teeth of said cylinder, a plate arranged above said cylinder and pivoted to swing vertically, a guide rod which is mounted on said plate and which carries said comb, and a spring surrounding said rod and operating on said comb for yieldingly holding the same in its innermost position.

2. A disintegrator comprising a casing having an inlet for the material to be disintegrated and an outlet for the disintegrated material, a rotary cylinder arranged in the casing and provided with teeth on its periphery, a comb arranged above said outlet and having the space between its teeth traversed by the teeth of said cylinder, a plate arranged above said cylinder and pivotally mounted at its inner end to swing vertically, stop means to limit the downward movement of said plate, means on said plate for guiding said comb to move horizontally and spring means for holding said comb yieldingly in its innermost position.

In testimony whereof I affix my signature.

STEPHEN A. KOST.